Feb. 19, 1952          C. J. WILKEN          2,586,133
METHOD OF TREATING POTABLE DISTILLED SPIRITS
Filed June 13, 1949
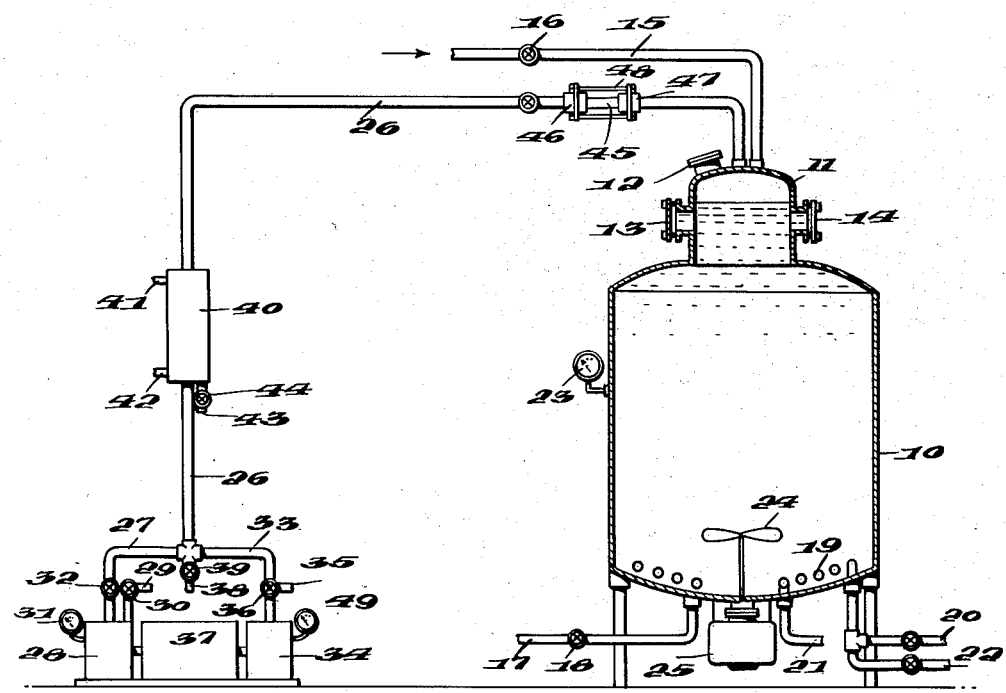
Inventor
CASEY J. WILKEN,
By Parry + Miller
ATTORNEYS Patented Feb. 19, 1952

2,586,133

UNITED STATES PATENT OFFICE 2,586,133

METHOD OF TREATING POTABLE DISTILLED SPIRITS

Casey J. Wilken, Herndon, Va.

Application June 13, 1949, Serial No. 98,686

16 Claims. (Cl. 99—48)

This invention is directed to a novel method of treating all kinds of potable distilled spirits which will serve to make them more palatable. The treatment serves to impart to such alcoholic beverages a mellower flavor and eliminate, or noticeably reduce taste sharpness or "bite" so that the taste is milder.

The novel method is auxiliary to and not a substitute for conventional treatments employed in the production of distilled spirits. It is believed to be unique because of its general application to various types potable distilled spirits and also because it does not require the use of any additives or flavor modifying agents. It is purely mechanical and may be generally described as a cyclic vacuum method since the characterizing feature thereof is the application of vacuum to distilled spirits intermittently for periods of relatively short duration.

The new method is applicable to treatment of the class of distilled spirits requiring aging treatment with charred wood such as all types of whiskies, neutral spirits blends of whiskies and brandies. These will ordinarily be treated by the method while in the green state, before aging, but they also may be treated after aging with noticeable flavor improvement. The method is equally applicable to the class of distilled spirits which do not require aging such as all types of gin, rums and neutral spirits and these will be treated preparatory to bottling.

The degree of flavor improvement obtained by the method will vary with different kinds of distilled spirits. It will also vary with different grades of the same type. Thus, for example, whiskies of inferior quality can be improved in flavor by the new method to a greater degree than superior quality whiskies. Whatever the flavor change obtained it depends upon the kind and amount of constituents which can be removed under my vacuum treatment and possibly also upon some modification in the retained esters or other components. In any event, the beneficial flavor change obtained under the method appears to be different from and not merely the equivalent of the improvement in flavor such as obtained by aging.

The characterizing feature of the method is the repeated application to distilled spirits for short periods of vacuum. The vacuum is controlled in amount to generate small bubbles which rise throughout the body of the spirits to the surface thereof and are removed under the pull of the vacuum. Between each period of vacuum treatment the spirits are subjected to a short period or periods of pressure. During the cyclic treatments the spirits should be warm but not over 90° F. The preferred operating temperature will vary with different distilled spirits and this is also true as to the amount of vacuum. During the periods of pressure treatment, but not during the periods of vacuum treatment, the spirits are preferably subjected to mechanical agitation. Each treatment period is relatively short, a matter of minutes, and the complete operation requires only a matter of hours under most adverse conditions and in some instances satisfactory taste improvement can be obtained in about one half hour.

I have found that control of the amount of vacuum is quite important and that both the amount and the length of the periods of application can best be determined visually. The amount of vacuum should be sufficiently high to cause the formation of relatively small bubbles in the distilled spirits of a size smaller than a pea and preferably about the fine size of bubbles in a glass of champagne. Such bubbles rise to the top surface of the spirits and the contents thereof are withdrawn under the vacuum.

If too high a vacuum is employed the spirits are likely to boil, coarse bubbles being formed carrying away desirable components of the spirits which should be retained. It has also been found that application to the spirits of an amount of vacuum which is considered satisfactory if too prolonged will result in undesirable boiling of the spirits. It is for this reason that the vacuum is applied intermittently. The periods of vacuum application are terminated short of the time boiling begins. It is well known, of course, that the application of vacuum to a liquid lowers its boiling point, the boiling point progressively decreasing the higher the vacuum. By selection of an amount of vacuum which will produce mild fine bubble generation and limiting its period of application the main body of the spirits can be maintained in a substantially quiescent state. Only those components of the spirits which are readily removable without boiling of the spirits are withdrawn under the vacuum. These constitute an extremely small part of the spirits, ranging downwardly from about 1 percent to a fractional percentage.

The composition of the small bubbles which are removed under limited vacuum necessarily varies with the composition of various distilled spirits but in general will comprise the lowest boiling and most volatile constituents and at least in some cases gases which have been absorbed in the spirits. In the case of whiskies, for example, many tests have indicated that the improvement in flavor obtained by the method may result from the removal of carbon dioxide gas which appears to adversely effect the taste of whisky when present even in relatively small amounts. In this connection it may be explained that in the production of whisky malt converts the grain starches into sugars and such sugars are split by yeast into alcohol with carbon dioxide as a by-product. Carbon dioxide gas is soluble in alcohols and while it might be supposed to be removed in the whisky distilling stage at least a portion is likely to be retained by the whisky vapors and remain when such vapors are condensed to liquid state.

According to one practice of the method a two cycle pressure treatment is repeatedly employed. In one period of the cycle the spirits are subjected to vacuum. During the next period of the cycle air or other inert gas pressure is applied. Such pressure may be atmospheric pressure or pressure above atmospheric pressure. According to another practice of the method a three cycle pressure treatment is repeatedly employed. Thereunder the spirits are subjected to a period of vacuum, to a period of pressure above atmospheric pressure and to periods of atmospheric pressure intervening between the two other periods.

While the use of atmospheric pressure in conjunction with vacuum produces noticeable flavor improvement I have found that generally the use of pressure above atmospheric pressure, in conjunction with vacuum in a two cycle treatment or as an additional pressure stage with atmospheric pressure in a three cycle treatment yields a greater degree of flavor improvement. I am inclined to believe that the application of such pressure may beneficially modify the composition of the spirits, as by modifying or promoting blending of the mixed components thereof or perhaps promoting homogeneity. Again, it may well be that such pressure conditions the mass for ready removal under the vacuum of the undesirable components of the spirits.

The amount of pressure above atmospheric need not be high. A moderate pressure of 50 pounds gauge pressure or less is considered a maximum and I prefer to employ a pressure in the range of 15 to 25 pounds gauge pressure.

The amount of vacuum employed and the length of its periods of application can not be definitely fixed and can best be determined by visual test as above explained since they will depend upon the nature of the spirits and the quantity thereof, also on their temperature. I find that generally a vacuum of 25 inches of mercury gauge pressure is the preferred maximum although I have employed higher vacuums successfully without boiling of the spirits by employing shorter periods of application than otherwise. I now consider that the minimum vacuum which will produce the desired small bubble formation and escape is 5 inches of mercury gauge pressure. Under such a vacuum the rate of bubble formation may be relatively rapid at the start of the initial vacuum period with certain types of spirits, such as inferior grades of green whisky. Ordinarily I have found that a vacuum in the range of 5 to 15 inches of vacuum is desirable in the initial vacuum period. If a higher vacuum is employed in the start there is frequently a tendency of the spirits to foam at the surface and the foam formed may enter the vacuum system.

I have also observed that the rate of bubble formation diminishes in successive cycles and that in some instances it is desirable to employ a higher vacuum after the first cycle to promote bubble formation and insure removal of the undesirable components of the spirits. Thus if a vacuum within the range of 5 to 15 inches is employed in the initial cycle a vacuum of 20 or 25 inches may be employed in subsequent cycle or cycles.

With vacuums of the order just indicated the periods of application will vary from 5 minutes to 30 minutes to insure against boiling, depending upon the type of spirits to be treated. As already indicated too long periods of vacuum may result in boiling of the spirits. Again, I find that the desired fine bubble formation ceases or diminishes materially in 30 minutes or less but can be revived in the next vacuum period after the intervening period or periods of pressure.

The length of the periods of application of atmospheric and/or higher pressure does not appear to be critical and may vary from one minute to half an hour or more. I generally prefer to employ equal periods of pressure and vacuum although this is not necessary.

The number of vacuum and pressure cycles is determined by the nature and quality of the spirits treated. With some spirits no bubble generation is obtained after two complete cycles. The number can vary up to five or six cycles as a maximum.

While I have successfully treated various types of distilled spirits in small quantities of one gallon and less, it is desirable for commercial purposes to treat spirits in large quantities of, say, 2,000 gallons or more. The tank or other vessel used for processing should be of limited diameter, preferably not over two or three feet, at least in the upper portion at and above the top surface of the spirits. Under such conditions the vacuum and pressure build up more quickly to their desired values. Also, the contents of the escaping bubbles during the vacuum periods are drawn off by the vacuum with greater facility with little or no condensation on the upper wall surfaces of the vessel above the liquid level.

In the accompanying drawing is illustrated apparatus for carrying out the process. In such drawing:

Fig. 1 is a more or less diagrammatic view, partly in sectional elevation of one form of apparatus for carrying out my process; and, Fig. 2 is an enlarged fragmentary diagrammatic view of a vacuum and pressure pump unit similar to that shown in Fig. 1 equipped with automatically controlled valves.

In Fig. 1 there is a large processing tank 10 of stainless steel and strong enough in its construction to withstand both high internal vacuum and pressure. At the top of the tank is a dome 11 of reduced diameter. A pressure type port 12 is provided in the dome to facilitate cleaning of the tank. Located on opposite sides of the dome are two sight lenses 13 and 14 of heavy glass for the observation of bubble formation of spirits undergoing processing in the tank. An inlet pipe 15 is provided for feeding spirits into the tank. A cut-off valve 16 is provided for cutting off the flow when the tank is filled. A discharge pipe 17 for conducting away spirits after treatment communicates with the bottom of the tank and is provided with a cut-off valve 18.

Located in the lower portion of the tank is a stainless steel pressure resistant heating coil 19 connecting with a steam supply pipe 20 and an outlet pipe 21. The inlet end of the coil is also connected to a cold water pipe 22 for cooling spirits after processing where this is found desirable. A thermometer 23 is mounted on the side of tank 10 which will show the temperature of the spirits in the tank.

Agitating means are provided for circulating spirits in tank 10. The same may be of any conventional type. I have illustrated a simple blade type agitator 24 driven by an electric motor 25.

A pressure pipe 26 communicates with the top of the dome 11. Such pipe at its other end has a branch 27 connecting with a rotary vacuum pump 28 of conventional design. Such pump is provided with an air vent 29 controlled by a valve 30 for regulating the amount of vacuum developed in lines 27 and 26 and in tank 10. A vacuum gauge 31 is here shown attached to pump 28. A cut-off valve 32 is provided in branch pipe 27 for closing line 26 from communication with the vacuum pump during periods of pressure treatment.

A second branch line 33 connects pipe 26 with a rotary pressure pump 34 of conventional type, and pressure vent 35 connects with the pump through line 33. A two-way valve 36 is provided. In one position such valve connects pipe 26 with pump 34 and closes vent 35. In its other position valve 36 cuts off communication between pipe 26 and the pump and opens vent 35 to communicate with the pump.

Vacuum pump 28 and high pressure pump 34 are driven by a common electric motor 37 so that both run continuously. It is for this reason that pressure vent 35 is provided in conjunction with pump 34 and vent 29 is important in conjunction with pump 28 when vacuum is not being supplied to the tank for similar reasons as well as for permitting adjustment of the amount of vacuum during periods of vacuum treatment.

A further vent 38 controlled by cut-off valve 39 communicates with line 26 which permits tank 10 to be subjected to atmospheric pressure when valves 32 and 36 cut off communication with pumps 28 and 34. High pressure gauge 49 connects with pump 34.

Interposed in pipe 26 is a conventional type of condenser 40 having a cooling coil (not shown) connecting with inlet and outlet pipes 41 and 42 for circulating a cooling fluid therethrough. Such condenser serves to condense the contents of the bubbles withdrawn from the spirits in the tank under the vacuum. A discharge pipe 43 controlled by a cut-off valve 44 is provided for withdrawing condensed products from the condenser. Since the amount of spirits removed under the vacuum treatment is comparatively small condenser 40 need not be of large capacity.

Also located in pipe 26 adjacent tank dome 11 is a clear glass pipe section 45 mounted by couplings 46 and 47 and sealed by securing bolts 48. If foaming should occur accidentally under vacuum at the top of the spirits in dome 11 the foam will be drawn into pipe 26 and can be observed through glass pipe 45. Such a condition indicates that too high a vacuum is being employed and the same can be decreased until the foaming stops by adjusting the vacuum regulating vent 29 by means of valve 30.

The apparatus just described is designed for operation with a three period repeated pressure cycle. After the tank is filled through pipe 15 to a level above sight glasses 13 and 14 valve 16 is closed and steam is circulated through heating coil 14 to warm the spirits to a temperature ranging from 70° to 90° F. Motor 37 is started and valve 32 opened to subject the spirits to vacuum and the amount of vacuum is adjusted by means of valve 30. Within a minute or so a rising bubble formation in the spirits will be observed through sight glasses 13 and 14. If the bubbles are larger than a pea, indicating boiling of the spirits, or if foam is observed in glass pipe 45, valve 30 is adjusted to reduce the vacuum until a fine bubble formation is obtained while the body of the spirits is in a substantially quiescent state. At the end of the vacuum period valve 32 is closed and valve 39 opened to subject the spirits in the tank to atmospheric pressure. At the end of such pressure period valve 39 is closed and valve 36 adjusted to supply pressure to the spirits in the tank from pump 34. At the end of such high pressure period valve 36 is closed and the first treatment cycle is completed. The cycle is repeated until little or no bubble formation is observed in the spirits when the vacuum is applied. Agitator 24 is usually operated during both the atmospheric pressure period and high pressure period of each cycle. It may however be operated only during one or the other of such pressure periods. Ordinarily it will not be operated during the vacuum periods although it can be used under such conditions where the rate of bubble formation is not rapid.

Where a relatively low or moderate vacuum is employed in the first cycle valve 30 may be adjusted to increase the vacuum at the beginning of the second cycle up to an amount where the desired fine bubble generation is still obtained and the spirits do not boil. Pump 34 is designed to supply constant high pressure in the range of 15 to 50 pounds since the amount of pressure is not critical and will be the same during the high pressure period of all cycles.

At the end of the final cycle the treated spirits are drawn off from tank 10 through line 17. They may be preliminarily cooled before doing so by circulating cold water from line 22 through line 19.

Operation with a two cycle treatment of vacuum and high pressure is the same as just described for the three cycle treatment except that valve 39 is only momentarily opened and closed to relieve vacuum in the tank at the end of the vacuum periods and to relieve pressure in the tank at the end of each high pressure period before the next vacuum period.

Operation with a two cycle treatment of vacuum and atmospheric pressure involves alternate adjustment of valves 32 and 39. For such treatment high pressure pump 34 may be completely dispensed with.

The various pressure control valves of the apparatus shown in Fig. 1 are all designed for manual operation. For large scale commercial employment of the process it may be found desirable to provide an automatic control arrangement. An illustrative type of automatic control is shown in Fig. 2. Vacuum pump 50 and high pressure pump 51 are again driven by a common electric motor 52. The treatment tank will be the same as in Fig. 1 and its pressure line 26 will communicate with pump 50 through branch vacuum line 53 provided with a solenoid operated cut-off valve 54. The vacuum applied to the tank can be adjusted by vent 55 controlled by a valve 56. Such valve is preferably manually operated so that the amount of vacuum may be adjusted at any time.

Pressure pipe 26 communicates with high pressure pump 51 through branch 57 provided with a solenoid operated two-way valve 58 which also connects with a pressure vent 59. Pressure pipe 26 is vented at the atmosphere through vent pipe 60 controlled by a solenoid operated valve 61.

The solenoid operated valves are controlled by a suitably timing unit adapted to cause vacuum, atmospheric pressure and high pressure to be supplied to the tank for predetermined time periods in repeated cycles. The valve solenoids are energized through common electric power supply lines 62, 63. Line 62 has a common connection with one terminal of each of the valves. Line 63 is selectively connected with the other terminal of the respective valves through the timing device. The latter includes a rotary metal timing drum 64 driven by an electric clock motor 65. The drum is driven by the motor to make one complete revolution for each pressure cycle. A rubbing contact 65 connects drum 64 with line 63. A series of raised metal contact strips extend circumferentially of the drum in axial spaced relation. Such strips are staggered circumferentially, each extending for one third of the circumference of the drum. Strip 66 coacts with rubbing contact 67 to cause the solenoid of valve 54 to be energized for establishing communication between the vacuum pump and line 26 during the vacuum period of a cycle. When the drum rotates to a position to carry strip 66 beyond contact 67 the valve solenoid is deenergized to cut off communication between the vacuum pump and line 26. Strip 68 coacts with rubbing contact 69 to energize the solenoid of valve 61 so as to subject line 26 to atmospheric pressure through vent 60. When the drum carries strip 68 beyond contact 69 the solenoid is deenergized to close valve 61. Strip 70 coacts with rubbing contact 71 to energize the solenoid of valve 58, causing the valve to establish communication between high pressure pump 51 in line 26 and closed end 59. When the drum carries strip 70 beyond contact 71 the valve solenoid is deenergized to cut off communication between line 26 and establish communication between the pump and vent 59.

With the arrangement of the control drum just described the automatic valves will be operated to supply vacuum, atmospheric pressure and high pressure for one complete cycle on each revolution of the drum. Since it is desirable to vent off high pressure at the end of one cycle to expedite the building up of the vacuum in the first period of the next cycle, drum 64 is provided with a short contact strip 72 in addition to strip 68 for coaction with contact 69 so that valve 61 may be momentarily energized to vent line 26 to the atmosphere between the high pressure and vacuum periods. Such a contact will have its forward end in the direction of motion of the drum alined with the forward end of contact strip 66 which controls the vacuum valve 54.

The following examples are representative of the use of the process in treating different types of distilled spirits. Since the operation of the apparatus has already been described in detail it will not therein be specifically referred to.

*Example 1*

Wood aged bonded whisky of good grade was reduced to 101 proof, 1 over bottling proof to allow for slight proof reduction in the course of the present process. The whisky was warmed to 80° F. The whisky was then subjected to vacuum for a 5 minute period and then subjected to atmospheric pressure for a 5 minute period. Such two cycle treatment was repeated once, using a vacuum of 15 inches of mercury. Thereafter the treated whisky was cooled at room temperature preparatory to bottling.

*Example 2*

London type gin of good grade was adjusted to 1 proof above bottling proof and warmed to 80° F. The same was then subjected to vacuum for a 15 minute period and then to atmospheric pressure for a 15 minute period. This cycle was repeated three times. For the first cycle the vacuum was initially 5 inches and was gradually increased during the course of the vacuum period up to 15 inches. For both of the other two cycles a higher vacuum of 25 inches was employed.

The same procedure is recommended for neutral spirits.

*Example 3*

Green whisky of inferior grade and ready for aging was adjusted to 104 proof and warmed to a temperature of approximately 90° F. The whisky was then subjected to vacuum for period of 30 minutes, then to atmospheric pressure for 30 minutes and then to high pressure for 30 minutes. This cycle was repeated five times. On the initial cycle the vacuum was 5 inches and was 25 inches on the remaining cycles. The high pressure was 25 pounds on all cycles.

The same procedure was followed in treating green Jamaica-type rum of medium grade adjusted to 110 proof.

*Example 4*

Green whisky of superior grade and ready for aging was adjusted to 104 proof and warmed to a temperature of approximately 90° F. The whisky was then subjected to vacuum for a 20 minute period, next to atmospheric pressure for a 20 minute period and then to high pressure for a 20 minute period. This cycle was repeated three times. On the initial cycle the vacuum was started at 5 inches and was increased to 15 inches at the end of 5 minutes. On the remaining two cycles the vacuum was 25 inches. The high pressure on all cycles was 25 pounds.

The same procedure was followed in treating green domestic brandy of superior grade adjusted to 107 proof.

*Example 5*

Blended whisky comprising 30 percent 4 year aged whisky and 70 percent neutral spirits preparatory to bottling at 86 proof was adjusted to 87 proof and warmed to a temperature of 75° F. The same was subjected to vacuum for a 15 minute period, next to atmospheric pressure for a 15 minutes period and then to high pressure for a 15 minute period. This cycle was repeated four more times. On the initial cycle the vacuum was 5 inches and the vacuum was 25 inches on the other four cycles. A high pressure of 25 pounds was employed on all cycles.

In all of the examples the spirits were agitated during all pressure periods but not during the vacuum periods.

The spirits treated under all of the examples were noticeably improved in taste. The degree of improvement varied, as might be expected, with their nature. All were mellower in flavor than before treatment. The improvement in the gin, rum and brandy was quite marked. The same was also true of the green whiskies although their taste manifested their lack of aging. It is believed that because of the degree of flavor improvement in such whiskies resulting from the treatment it is possible to employ a shorter aging period to produce aged whisky of acceptable palatability although, as already mentioned, the present process is not comparable to natural and artificial aging procedures. This last is indicated by the fact that the bonded whisky treated while previously having been fully aged, exhibited a noticeably mellower flavor after treatment although not as marked as with the other spirits treated.

It is to be understood that the amounts of vacuum and pressure, likewise the length of the periods and number of cycles in the various examples are merely illustrative and are subject to considerable variation as earlier explained. The only factors considered critical are the amount of vacuum and length of its periods of application so that the contents of the spirits are removed in small bubbles while the spirits remain below boiling.

The scope of the invention is to be determined according to the appended claims.

I claim:

1. The method of treating potable distilled spirits to remove undesirable constituents therefrom which comprises subjecting a body of such spirits in warm liquid state to vacuum and to gas pressure above a vacuum in repeated cycles, and during the periods of vacuum removing under vacuum slight volumes of those undesired constituents of the spirits which form, and rise out of the liquid as small bubbles while the main body of liquid spirit remains below boiling, the periods of gas pressure serving to limit the effect of vacuum on the body of liquid spirits.

2. The method of treating potable distilled spirits according to claim 1 wherein the vacuum periods are within the range of 5 to 30 minutes.

3. The method of treating potable distilled spirits according to claim 1 wherein both the vacuum periods and the gas pressure periods are within the range of 5 to 30 minutes.

4. The method of treating potable distilled spirits according to claim 1 wherein the vacuum periods are within the range of 5 to 30 minutes and the amount of vacuum is within the range of 5 to 25 inches of mercury.

5. The method of treating potable distilled spirits according to claim 1 wherein both the vacuum periods and the gas pressure periods are within the range of 5 to 30 minutes, the amount of vacuum is within the range of 5 to 25 inches of mercury and the gas pressure is within the range of atmospheric pressure to 50 lbs. gauge pressure.

6. The method of treating potable ditstilled spirits to remove undesirable constituents therefrom which includes repeatedly subjecting a body of such spirits in warm, below boiling state to intermittent periods of vacuum of controlled amount sufficient to cause the formation and escape of fine bubbles only from the spirits, the length of said periods being short of the time required to cause boiling under said vacuum of the main contents of spirits.

7. The method of treating potable distilled spirits to remove undesirable constituents therefrom which includes repeatedly subjecting a body of such spirits in warm, below boiling state to intermittent periods of different controlled amounts of vacuum, a lower vacuum being employed in the initial period than in the next period.

8. The method of treating potable distilled spirits to remove undesirable constituents therefrom which includes subjecting a body of such spirits in warm, below boiling state to a period of relatively lower vacuum, breaking the vacuum and subjecting the spirits to a period of relatively higher vacuum.

9. The method of treating potable distilled spirits to remove undesirable constituents therefrom which includes repeatedly subjecting a body of such spirits in warm, below boiling state to intermittent periods of vacuum, the vacuum in the initial period being within the range of 5 to 15 inches of mercury and being increased thereafter to greater than 15 inches of mercury.

10. The method of treating potable distilled spirits to remove undesirable constituents therefrom which includes repeatedly subjecting a body of such spirits in warm, below boiling state to intermittent periods of controlled vacuum and subjecting the spirits to atmospheric pressure between said vacuum periods.

11. The method of treating potable distilled spirits to remove undesirable constituents therefrom which includes repeatedly subjecting a body of such spirits in warm, below boiling state to intermittent periods of vacuum of controlled amount to cause the formation in and escape from the spirits of fine bubbles only and subjecting the spirits to pressure above atmospheric pressure between said vacuum periods.

12. The method of treating potable distilled spirits to remove undesirable constituents therefrom which includes repeatedly subjecting a body of such spirits in warm, below boiling state to intermittent periods of controlled vacuum and to periods of atmospheric pressure and pressure above atmospheric pressure between said vacuum periods.

13. The method of treating potable distilled spirits to remove undesirable constituents therefrom which includes repeatedly subjecting a body of such spirits in warm, below boiling state to periods of controlled vacuum, to periods of pressure above atmospheric pressure and to periods of atmospheric pressure intervening between the vacuum and above atmospheric pressure periods.

14. The method of treating potable distilled spirits to remove undesirable constituents therefrom which includes repeatedly subjecting a body of such spirits in warm, below boiling state to controlled vacuum, atmospheric pressure and pressure above atmospheric pressure for periods each within a range of 5 to 30 minutes.

15. The method of treating potable distilled spirits to remove undesirable constituents therefrom which includes subjecting a body of such spirits in warm, below boiling state to a period of vacuum within a range of 5 to 15 inches of mercury, next to a period of atmospheric pressure and then to a period of pressure above atmospheric pressure, each of said periods not exceeding 30 minutes, then repeating said operation with an increased vacuum greater than 15 inches of mercury during the vacuum period.

16. The method of treating potable distilled spirits to remove undesirable constituents therefrom which includes repeatedly subjecting a body of such spirits in warm, below boiling state to intermittent periods of controlled vacuum and intervening periods of pressure, maintaining the spirits in a substantially quiescent state during the vacuum periods and agitating the spirits during the pressure periods.

CASEY J. WILKEN.

REFERENCES CITED

The following references are of record in the file of this patent:

UNITED STATES PATENTS

| Number | Name | Date |
|---|---|---|
| 1,906,007 | Heuser et al. | Apr. 25, 1933 |
| 2,117,604 | Fessler et al. | May 17, 1938 |
| 2,500,951 | Kraft | Mar. 21, 1950 |